(12) United States Patent
Rusek et al.

(10) Patent No.: US 12,165,230 B2
(45) Date of Patent: Dec. 10, 2024

(54) SYSTEMS AND METHODS FOR GENERATING TITLE REPORTS

(71) Applicant: American Land Title Exchange, LLC, Atlanta, GA (US)

(72) Inventors: Stasio French Rusek, East Point, GA (US); Stephen Michael Beehler, Marietta, GA (US)

(73) Assignee: American Land Title Exchange, LLC, Atlanta, GA (US)

( * ) Notice: Subject to any disclaimer, the term of this patent is extended or adjusted under 35 U.S.C. 154(b) by 601 days.

(21) Appl. No.: 17/361,737

(22) Filed: Jun. 29, 2021

(65) Prior Publication Data

US 2022/0414806 A1 Dec. 29, 2022

(51) Int. Cl.
| | | |
|---|---|---|
| *G06Q 10/00* | (2023.01) | |
| *G06F 16/25* | (2019.01) | |
| *G06F 40/103* | (2020.01) | |
| *G06Q 10/10* | (2023.01) | |
| *G06Q 20/08* | (2012.01) | |
| *G06Q 30/018* | (2023.01) | |
| *G06Q 50/16* | (2012.01) | |
| *G06V 30/40* | (2022.01) | |
| *G06Q 30/08* | (2012.01) | |
| *G06V 30/10* | (2022.01) | |

(52) U.S. Cl.
CPC ......... *G06Q 50/167* (2013.01); *G06F 16/258* (2019.01); *G06F 40/103* (2020.01); *G06Q 10/10* (2013.01); *G06Q 20/085* (2013.01); *G06Q 30/018* (2013.01); *G06V 30/40* (2022.01); *G06Q 30/08* (2013.01); *G06V 30/10* (2022.01)

(58) Field of Classification Search
CPC .... G06Q 50/167; G06Q 10/10; G06Q 20/085; G06Q 30/018; G06Q 30/08; G06F 16/258; G06F 40/103; G06V 30/40; G06V 30/10
See application file for complete search history.

(56) References Cited

U.S. PATENT DOCUMENTS

| | | | |
|---|---|---|---|
| 7,548,884 B1 * | 6/2009 | Thomas | G06Q 30/0623 705/38 |
| 2007/0174076 A1 * | 7/2007 | Kord | G06Q 30/06 705/316 |
| 2010/0161496 A1 * | 6/2010 | Zalewski | G06F 8/20 705/80 |
| 2019/0050954 A1 * | 2/2019 | Perez | G06Q 50/18 |

OTHER PUBLICATIONS

Title Leader retrieved from the Internet Archive WayBack Machine at https://web.archive.org/web/20201201140303/https://titleleader.com/why/#faq (Year: 2020).*

* cited by examiner

*Primary Examiner* — Gabrielle A McCormick
(74) *Attorney, Agent, or Firm* — Troutman Pepper Hamilton Sanders LLP; Brandon M. Reed

(57) ABSTRACT

The present disclosure provides systems and methods for generating title reports in standardized formats and providing an environment for exchanging the title reports. The system can receive property documents from a plurality of sources. The property documents can be appended with metadata so as to enable the system to order the property documents within a title report. In some examples, generated title reports can accessible within a cloud environment for requesting entities to access.

13 Claims, 10 Drawing Sheets

Title Report

Property Information — 505
County: Fulton  Address: 123 Elm St., Atlanta
Date Searched: June 14, 2021  State: GA
Search Type: Residential  Zip: 31111

Property Legal Information — 510
Property Type: Subdivision  Name: Hidden Estates
District: 18  Land Lot: 3  Section: First

Current Owner — 515
John A. Smith
Deed Book: 533  Page: 1357

Security Interests — 520
Security Deed  Deed Book: 533  Page 1357
Deed Date: August 15, 2012  Date Recorded: August 20, 2012
Amount: $575,400.00  Grantor: James R. Stanley
Grantee: MERS / Fidelity Bank D/B/A Fidelity Bank Mortgage

Judgement/Liens — 525
None to Report

Easements/Leases — 530
None to Report

Protective Covenants — 535
Protective Covenant
Deed Book: W1  Page: 125
Instrument Date: April 6, 1986  Date Recorded: April 8, 1986

Chain of Title — 540
Executor's Deed  Deed Book: 553  Page: 423
Deed Date: August 28, 2018  Date Recorded: August 30, 2018
Grantee: James R. Stanley

Taxes — 545
County Taxes
County: Fulton  Tax Year: 2020  Tax Payer Name: John A. Smith
Assessed Value: $590,986.00  Parcel ID: 0224B-00000-100-00
Amount Paid: $2954.54  Date Paid: December 31, 2020

*FIG. 5*

SYSTEMS AND METHODS FOR GENERATING TITLE REPORTS

FIELD

The present disclosure relates generally to generating title reports and, more particularly, to systems and methods for generating title reports in standardized formats and providing an environment for exchanging the title reports.

BACKGROUND

In the purchase and/or sale of real property, one of the most important steps to ensure that the real property listed in the transaction is accurate, without encumbrances, and without hidden issues is performing a title search. A title search is process of examining public records for information related to the real property of interest, records such as security interests, liens, easements, protective covenants, chains of title, and the like. Although the title search is important to ensure all rights in the real property are known and acknowledged, the process of preparing these title reports is time consuming and mostly unchanged for decades.

These title records are ordinarily stored by a governmental body. Some of the documents, for example those executed and/or recorded in the past couple decades, may be accessible electronically from public (e.g., government) or private entities, which can store them on a web site in a downloadable format. In a vast number of other cases, however, the title records are stored as hard copies, usually at the county courthouse. For these documents, the title abstractor (i.e., the person who gathers the documents and creates the title report) must travel to the courthouse, pay for scans of the hard copies, save those scans, and add them with any digital copies they already have stored for the property. After all records have been saved, the title abstractor, or an end user like a closing attorney, needs to sort through each of the documents and arrange/order them according to industry standards.

As can be understood based on the above, building titles can be a labor intensive process that includes retrieving data from a plurality of sources and ordering them manually. In addition to these problems, once a title report has been created, current processes do not enable that title report to be reused by someone other than the party that requested the title. For example, if a second closing attorney wishes to have a title report completed for the same real property as a first closing attorney, the second closing attorney will need to run an entire new title report, thereby duplicating the labor intensive process. Accordingly, there is a need for improved systems and methods for building standardized title reports from multiple locations and/or formats.

BRIEF SUMMARY OF THE INVENTION

Examples of the present disclosure relate generally to generating title reports and, more particularly, to systems and methods for generating title reports in standardized formats and providing an environment for exchanging the title reports.

In one embodiment, the present disclosure provides a system for building a title in a standardized format. The system can perform steps of a process for building the title. The process can include receiving, at the one or more processors, a request to generate the title. The request can include information related to a real property of interest. The process can include receiving, at the one more processors, a first document associated with the real property of interest. The first document can include first metadata created responsive to a first document input received from a first user device. The first metadata can include a first timing element. The process can include receiving, at the one more processors, a second document associated with the real property of interest. The second document can include second metadata created responsive to a second document input received from the first user device and/or a second user device. The second metadata can include a second timing element. The process can include generating, via the one or more processors, the title to include the first document and the second document. The first document and the second document can appear within the title in an order based on at least one of: (i) the first timing element and the second timing element, or (ii) a standardized order for title documentation.

In any of the embodiments described herein, the first document can be a digital file retrieved by the first user device from a document entity storing a plurality of property documents. The second document can be an image file captured by the first user device and/or the second user device. The image file can be associated with a hard copy of a property document.

In any of the embodiments described herein, the process can include using optical character recognition (OCR) to identify at least one of the first timing element, the second timing element, the first document input, or the second document input.

In any of the embodiments described herein, the first document input and the second document input can be received from one or more fields in a graphical user interface (GUI) associated with the system and displayed on the first user device and/or the second user device. The first document input and the second document input can include information about which type of property document is being uploaded.

In any of the embodiments described herein, the first timing element can include at least one of a first recordation date or a first deed book location associated with the first document. The second timing element can include at least one of a second recordation date or a second deed book location associated with the second document.

In any of the embodiments described herein, the first deed book location and/or the second deed book location can include character identifiers configured to arrange one or more deed books chronologically. The one or more deed books can be chronologically arranged according to one or more arranging rules. The process can further include storing, in a database, the one or more arranging rules for the one or more deed books. The process can further include arranging, via the one or more processors, the first timing element and the second timing element based on the one or more arranging rules.

In any of the embodiments described herein, the process can further include storing, in a database, a plurality of title reports comprising the title, the plurality of title reports being accessible by a plurality of user devices and searchable based at least upon property addresses associated with a plurality of real properties. The process can further include receiving, at the one or more processors, an access request for the title from a third user device seeking a copy of the title responsive to purchasing the title. The process can further include transmitting, via a transceiver, the title to the third user device.

In any of the embodiments described herein, the process can further include displaying, via the one or more processors, the plurality of real properties on a map within a graphical user interface displayed on the plurality of user devices. A location of each of the plurality of real properties can be superimposed on the map. The location of each of the plurality of real properties can be selectable to view and/or purchase a title report associated with a selected property.

In any of the embodiments described herein, the process can further include receiving, at the one or more processors, a partial address for the real property of interest. The process can further include auto-filling, via the one or more processors and a mapping application programming interface (API) connecting the one or more processors to a third-party map service, a full address for the real property of interest to confirm a recording address for the real property of interest is accurate and consistent for all user devices accessing a database associated with the system.

In one embodiment, the present disclosure provides a user device for building and uploading a title in a standardized format. The user device can perform steps of a process for building and uploading the title. The process can include receiving, at the one or more processors, a request to generate the title for a real property of interest. The request can be received at a graphical user interface (GUI) associated with a title system. The process can include receiving, at the one or more processors, a first document associated with the real property of interest. The first document can include first metadata created responsive to a first document input. The first metadata can include a first timing element. The process can include receiving, at the one or more processors, a second document associated with the real property of interest. The second document can include second metadata created responsive to a second document input. The second metadata can include a second timing element. The process can include generating, at the one or more processors and via a transceiver, the title to include the first document and the second document. The first document and the second document can appear within the title in an order based on at least one of: (i) the first timing element and the second timing element, or (ii) a standardized order for title documentation.

In any of the embodiments described herein, the device can comprise an image capture device. The first document can be a digital file received by the user device from a document entity storing a plurality of property documents. The second document can be an image file captured by the image capture device. The image file can be associated with a hard copy of a property document.

In any of the embodiments described herein, the process can include using optical character recognition (OCR) to identify at least one of the first timing element, the second timing element, the first document input, or the second document input.

In any of the embodiments described herein, the process can include receiving, at the one or more processors, the first document input from one or more fields in the GUI and displayed on the user device. The process can include receiving, at the one or more processors, the second document input from the one or more fields.

In any of the embodiments described herein, the first timing element can include at least one of a first recordation date or a first deed book location associated with the first document. The second timing element can include at least one of a second recordation date or a second deed book location associated with the second document.

In any of the embodiments described herein, the first deed book location and/or the second deed book location can include character identifiers configured to arrange one or more deed books chronologically. A system or method of arranging the one or more deed books chronologically can be jurisdiction specific. The first document and the second document can be arranged in the title receive according to the system of arranging the one or more deed books.

In any of the embodiments described herein, the process can include receiving, at the one or more processors and via the GUI, a confirmation to provide the title for purchase on a cloud server operated by the title system.

In one embodiment, the present disclosure provides a method for exchanging and storing titles. The system can perform steps of a process for building the title. The method can include receiving, at one or more processors, a title request from a requesting entity seeking a title for a real property of interest. The title request can include a title fee. The method can include transmitting, via a transceiver in communication with one or more processors, a bid to a plurality of user devices requesting the title. The method can include receiving, at the one or more processors, the title from a first user device of the plurality of user devices. The method can include transmitting, via the transceiver, the title to the requesting entity free of identifying information associated with the first user device or a user of the first user device. The method can include transmitting, via the transceiver, an indication of at least a portion of the title fee to the first user device.

In any of the embodiments described herein, the method can include receiving, at the one or more processors, a first document associated with the real property of interest. The first document can include first metadata created responsive to a first document input received from the first user device. The first metadata including a first timing element. The method can include receiving, at the one or more processors, a second document associated with the real property of interest. The second document can include second metadata created responsive to a second document input received from the first user device. The second metadata can include a second timing element. The method can include generating, via the one or more processors, the title to include the first document and the second document. The first document and the second document can appear within the title in an order based on at least one of: (i) the first timing element and the second timing element, or (ii) a standardized order for title documentation.

In any of the embodiments described herein, the method can include selecting, via the one or more processors, the plurality of user devices from a larger subset of user devices stored in a database comprising a list of title abstractors. The plurality of user devices can be selected based on a ranking or rating system associated with users of the plurality of user devices.

In any of the embodiments described herein, the method can include selecting, via the one or more processors, the first user device from the plurality of user devices based on proximities of the plurality of user devices to a location of the real property of interest.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings:

FIG. 5 depicts an example generated title summary, according to the present disclosure;

DETAILED DESCRIPTION

Figure 1:
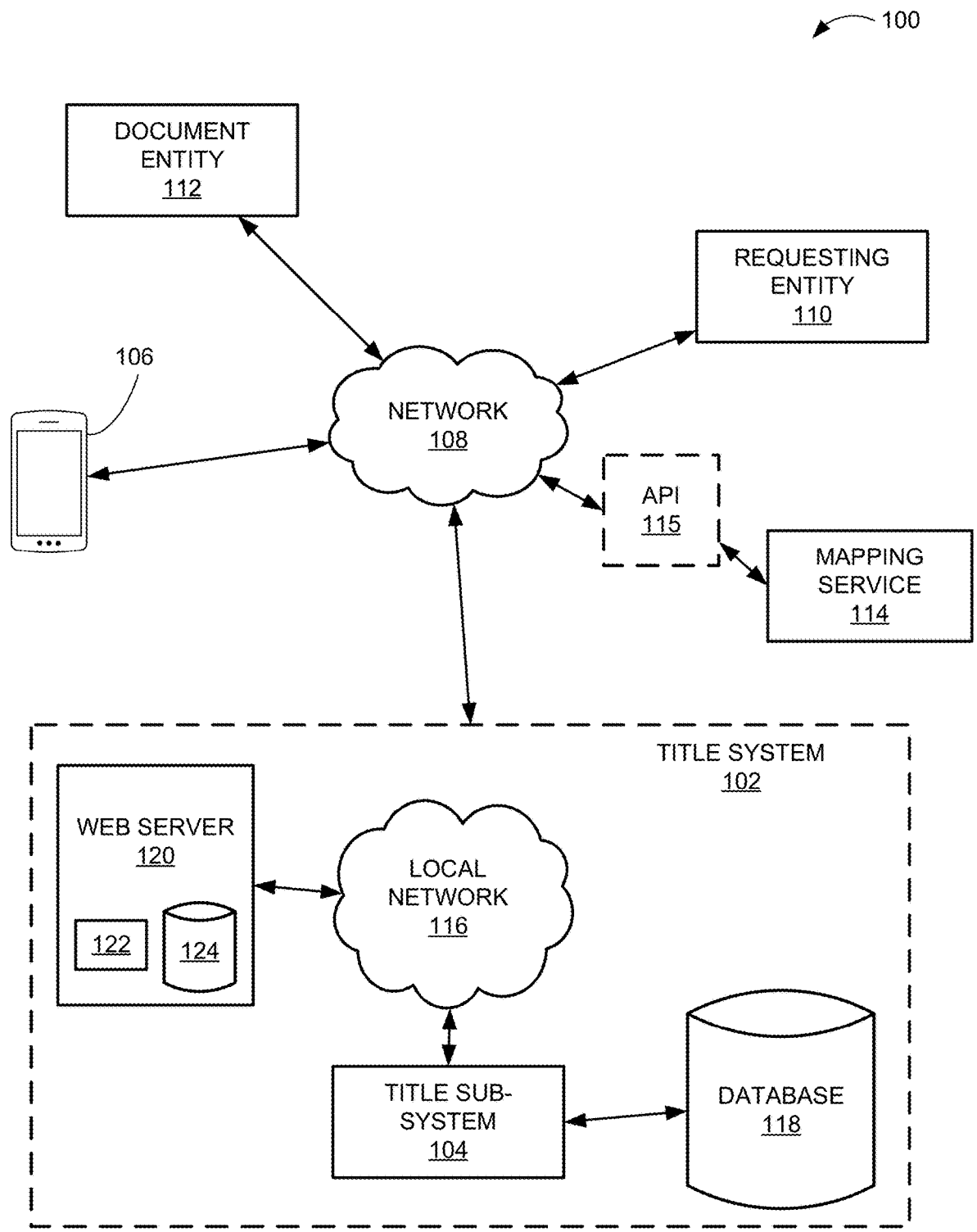
FIG. 1 is a diagram of an example system environment that can be used to implement one or more examples of the present disclosure.

Examples of the present disclosure relate generally to generating title reports and, more particularly, to systems and methods for generating title reports in standardized formats and providing an environment for exchanging the title reports. The systems and methods described herein are necessarily rooted in computer technology as they can relate to gathering digital files in a variety of formats, generating metadata to associate with those digital files, and creating a standardized format based on that metadata. In some examples, hard-copy files of property records can be uploaded into the systems and appended with metadata that allows the documents to be arranged according to industry and/or client-specific standards. The systems and methods can also utilize features of smart user device, such geographic location sensors (GLS) that provide location services enabling the system to identify locations of title abstractors that are closest to a particular real property and or government entity that stores title records. This can decrease the time required to process a title for a property as well as provide opportunities for title abstractors.

Throughout this disclosure, when reference is made to a title or title report, this will be understood to mean a final product of combined one or more public records (e.g., title documents or property documents) associated with a real property of interest. These property documents can include but are not limited to security interests (e.g., mortgages), judgement/liens, easements/leases, protective convenances, chains of title (e.g., deeds), and the like. When reference is made to title summary, this can include a summary of the property documents within the title.

Title abstractors will be understood as a user of the one or more user devices described herein that request that the title system(s) generate a title, request and/or upload one or more property documents to be included in the title, and/or provide document inputs to add metadata to the one or more property documents. As will be described in greater detail below, the title abstractors can be known to the title system (s) so that the system can select title abstractors to build the title reports using the systems and methods described herein. Reference is made herein to timing elements, which can mean data for a particular property document that indicates when the property document was recorded, e.g., at the courthouse of the county where the property is located. This timing element can include a deed book number, deed book page, document number, recordation date, and the like.

The systems and methods described herein provide options for title abstractors and entities that request titles (e.g., law firms, real-estate firms, buyers, sellers, etc.) to receive a complete title report that includes all property documents in a standardized format and/or sequence. Title abstractors previously received a request from a requiting entity, accessed documents online and/or scanned numerous hard-copy documents stored in courthouse records, printed these documents, and arranged them according to industry standards. The present systems and methods, however, can automatically create title reports, including a detailed title summary, based on metadata stored for each property document, whether the document is downloaded or manually scanned. Further, the systems and methods described herein provide solutions to the situation where multiple requesting entities request the same title report. Instead of requiring a new title to be generated in its entirety, from scratch, the systems and methods provide an exchange system that enables requesting entities to access and/or purchase completed titles from a cloud service. This further adds value to the stakeholders by utilizing technology to make digital titles accessible.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

FIG. 1 is a diagram of an example system environment 100 that can be used to implement one or more examples of the present disclosure. A more detailed explanation of the components of the system environment 100 is provided below. It is beneficial, however, to provide a brief overview to describe the components of the systems and methods generating title reports in standardized formats and providing an environment for exchanging the title reports. The system environment 100 can include a title system 102 that can perform the one or more processes or methods described herein for generating and/or providing titles. The system environment 100 can include one or more user devices 106. The user device 106 can be a computing device the performs steps such as requesting a title to be built, inputting documents (e.g., either from digital files or by creating digital files from hard copy files), inputting document inputs that identify the property documents, and the like.

The system environment 100 can include one or more requesting entities (e.g., a law firm, real-estate firm, etc.) that seek a prepared title from the abstractor (e.g., user device 106) and/or the system (e.g., title system 102). The system environment 100 can include a document entity 112, which can be a government entity web site, server, and the like that stores digital property documents. It is also contemplated that the document entity 112 could be a third-party service, such as other title systems that perform the processes and methods described herein, that store property documents. The system environment can also include a mapping service 114 that provides third-party mapping services for the title system 102. The mapping service(s) 114 can enable the title system 102 to provide a graphical user interface (GUI) with embeddings that show, within a map environment, which properties have a title report of record. The mapping service 114 can also provide additional services to the title system 102, such as providing a list of known property addresses. This can enable the GUI provided by the title system 102 to auto-fill property addresses when a user is inputting a first request to build a title report. For example, if a user begins to enter "123 Elm S," the user device 106 and/or title system 102 can receive a full address of "123 Elm St., Atlanta, G 31111." This can prevent errors in association between the actual real property of interest and the property documents associated with that real property of interest. To facilitate the mapping and auto-fill services provided by the mapping service 114, the title system 102 can communicate with the mapping service 114 via an application programming interface (API) 115 associated with the mapping service 114.

Figure 2:
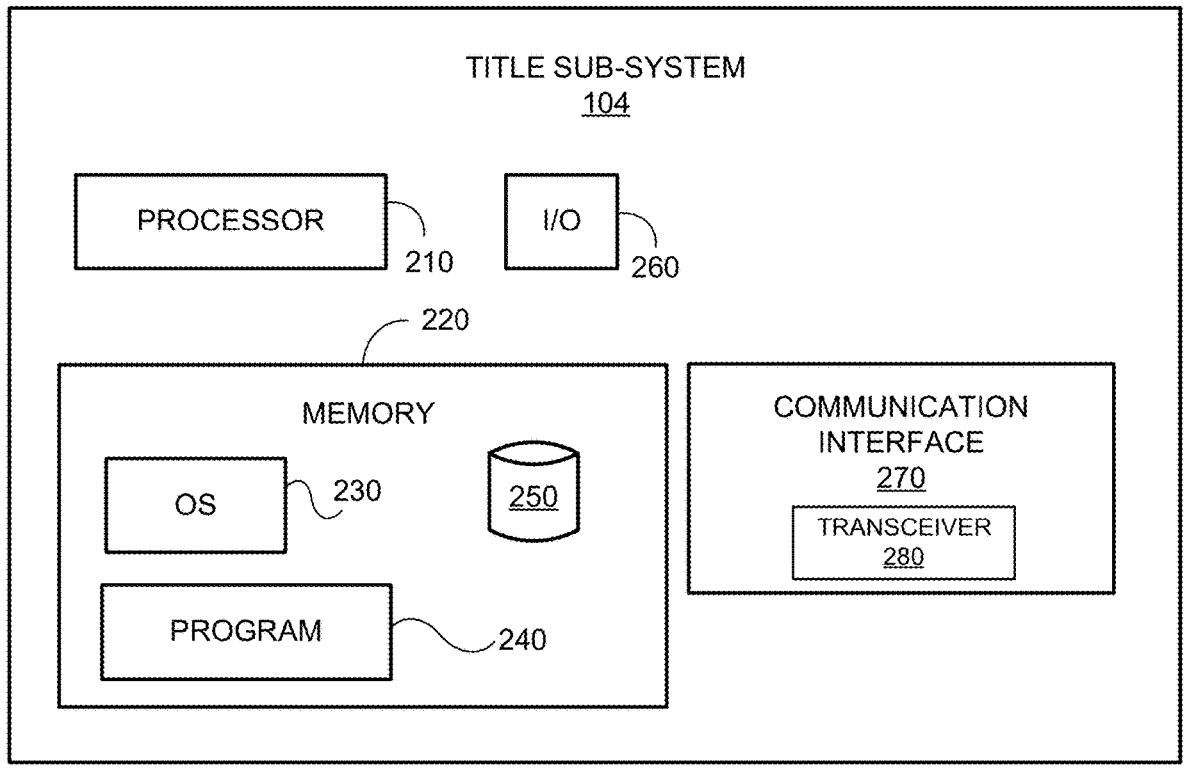
FIG. 2 is a component diagram of an example title sub-system, according to the present disclosure.

The title system 102, one or more user devices 106, requesting entity 110, document entity 112, and/or mapping service 114 can communicate via a wired or wireless network 108. The wired networks can be an Ethernet network and the wireless networks can be cellular or WiFi™ networks, for example. In some examples, network 108 can connect terminals, services, and user devices using direct connections such as WiFi™, ZigBee™, ambient backscatter communications (ABC) protocols, USB, WAN, or LAN. The connections can also be encrypted or otherwise secured. The title system 102 can be affiliated with a title service provider that provides the title services described herein (e.g., generating and exchanging titles) for a fee. The title system 102 can include and/or communicate with a title sub-system 104, which will be described in greater detail below and with respect to the component diagram shown in FIG. 2. The title sub-system 104 can include one or more processors (e.g., processor 210) and memory 220 that can perform the title generation processes described herein.

Figure 3:
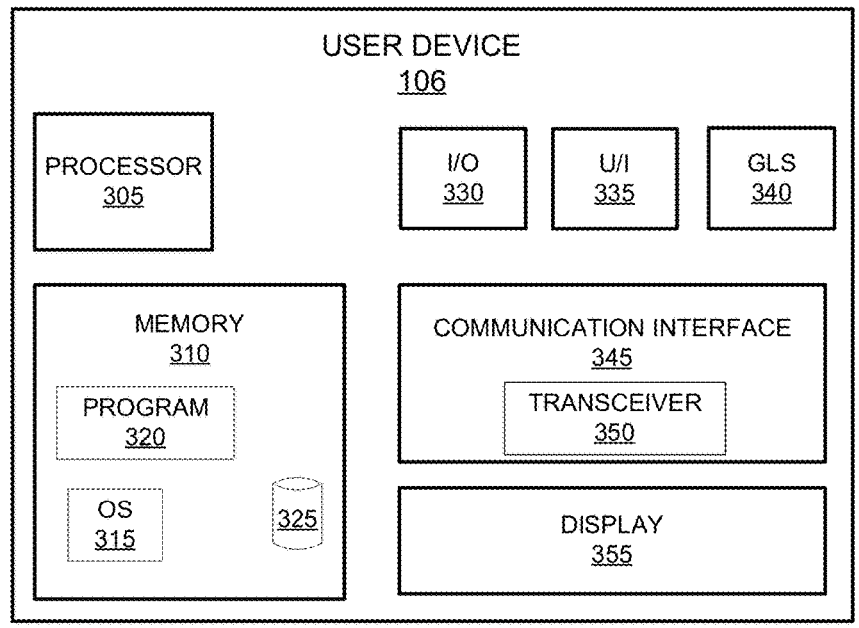
FIG. 3 is a component diagram of an example user device, according to the present disclosure.

FIG. 3 is a component diagram of an example user device 106, according to the present disclosure. The component diagram is described in greater detail below. It should be noted that, although only a single user device 106 is shown in FIG. 1 and FIG. 3, it will be understood that the processes described herein can be performed by more than one user devices. For example, a first user device can be used by an abstractor to retrieve property documents from a first source (e.g., from an online source such as the document entity 112), and a second user device can be used by the abstractor to retrieve property documents from a second source (e.g., take scans/photographs of hard-copy records). However, a single user device 106 can also retrieve documents from all sources.

Figure 4:
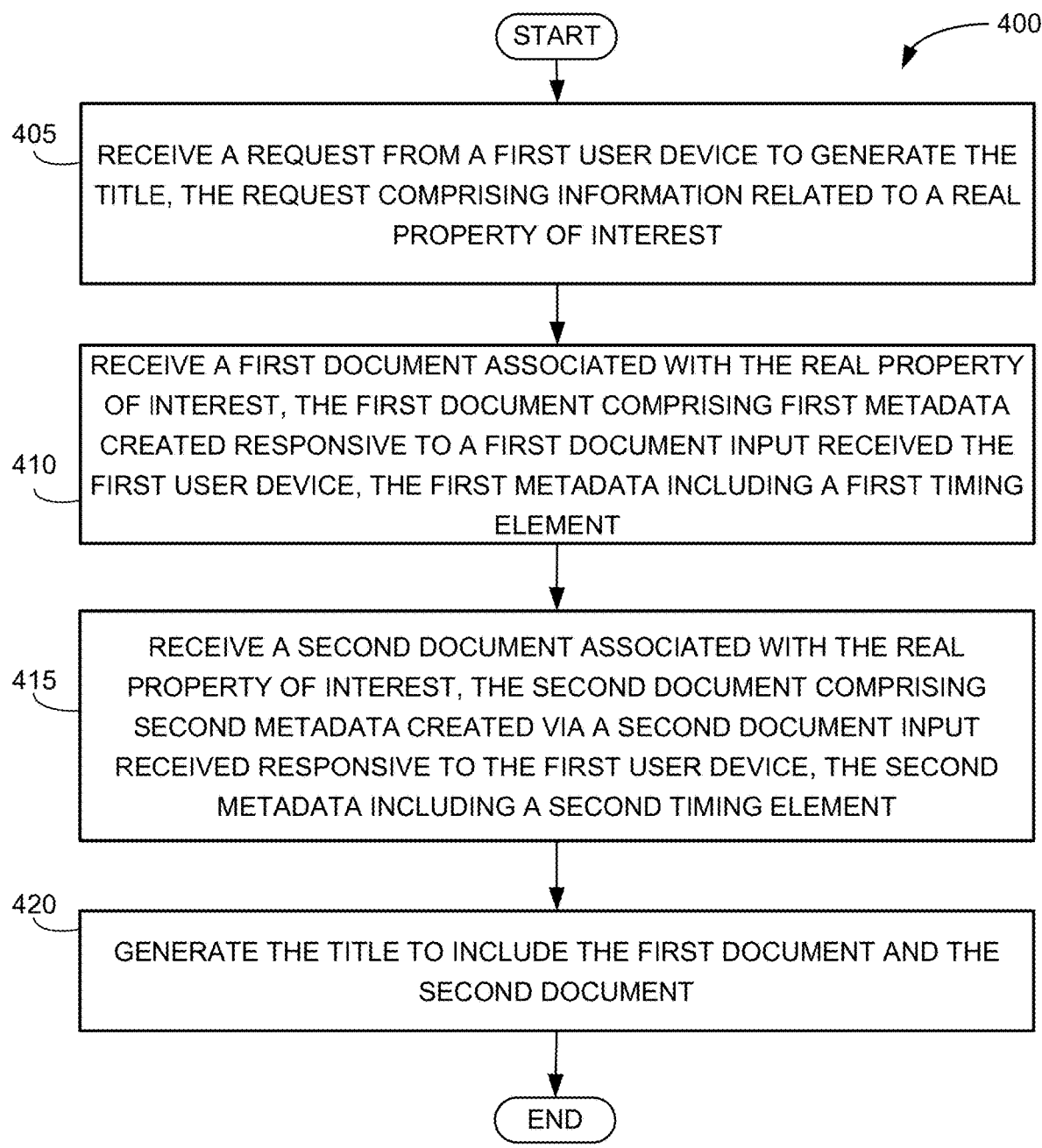
FIG. 4 is a flowchart of an example process for building a title in a standardized format, according to the present disclosure.

FIG. 4 is a flowchart of an example process 400 for building a title in a standardized format, according to the present disclosure. The steps of process 400 can be performed by one or more components of a title system 102 (e.g., title sub-system 104 and/or web server 120). In block 405, the title system 102 can receive, for example at a processor (e.g., processor 210 and/or processor 122), a request to generate the title (e.g., from a user device 106 and/or a requesting entity 110). The request can include information related to a real property of interest, including but not limited to a property address, lot number, district, etc. As described above, if the request includes a property address for the real property of interest, a mapping service (e.g., mapping service 114) can auto-fill addresses to ensure an accurate address is provided. In some examples, this auto-fill information can be populated based on a proximity to the user device (e.g., in the case that the user device includes a geographic location sensor).

In block 410, process 400 can include receiving, for example at the title system 102, a first document associated with the real property of interest. The first document can be inputted by a user device (e.g., user device 106) for receipt by the title system 102. The first document can be a digital file retrieved from a document entity 112 (e.g., county government website) in a digital format (e.g., PDF, JPEG, MPEG, PNG, etc.). The first document can include first metadata created responsive to a first document input received from a first user device. Document inputs can include information about the first document, such as what type of property document the first document is (e.g., security interest, judgement/lien, easement/lease, protective convenance, chain of title, etc.). The user device can input a timing element to include in the first metadata. The timing element can indicate when the property document was recorded. Timing elements can include, for example, a first recordation date and/or a first deed book location associated with the first document. As will be appreciated, a deed book location can include a book number, which can be ranked sequentially based on a local guideline, and a page number within the book. FIG. 6B and its related disclosure describes deed books and other timing elements in greater detail.

In block 415, process 400 can include receiving, for example at the title system 102, a second document associated with the real property of interest. The second document can be inputted by a user device (either the first user device in block 415 or a second user device) for receipt by the title system 102. The first document can be a hard copy record that is captured by the respective user device via an input/output device (e.g., I/O device 330, which can include a digital camera or other image capture device). The second document can include second metadata created responsive to a second document input received via the first user device and/or the second user device. The second metadata can include a second timing element, as defined above. The metadata can be added to the digital copies of the first document and/or second document via the user device. In other examples, the user device can transmit a copy of the property documents to the title system 102, and the title system 102 can append the metadata to the digital copy of the property documents.

In block 420, process 400 can include generating, for example via the title system 102, the title to include the first document and the second document appearing within the title. The system can arrange, or order, the property documents based on at least one of (i) the first timing element and the second timing element, or (ii) a standardized order for title documentation. Using the timing elements for illustration, if two documents are within the same document category (e.g., security interests), the first and second document can be arranged from newest to oldest within the title report. Referring to standardized orders for title document, many industries and/or stakeholders have preferred orders in which to arrange property documents. The title report can arrange the various property documents based on category, for example security interests, then judgments/liens, then easements/leases, then protective covenants, and so on. This example, however, is merely illustrative. It is also contemplated that the arranging can be based on a client preference. For example, the title system 102 can store arranging rules (e.g., in database 118) that are entity specific. A requesting entity 110 can, therefore, receive a title report in an order preferred by that particular entity.

Process 400 can end after block 420. In other examples, additional steps can be performed according to the examples described herein. For example, the title created by process 400 can be stored and made available to other entities wishing to retrieve a copy of the title searched for the particular property. Process 400 can include storing, in a database (e.g., database 118), a plurality of title reports comprising the title created in steps 405-420. The plurality of title reports can be accessible by a plurality of user devices and searchable based at least upon property addresses associated with a plurality of real properties. The list of property addresses can be provided in any type of order, including numerical and/or alphabetical based on street name. In some examples, the plurality of title reports can be listed on a map (e.g., map 630 in FIG. 6C) that enables a requesting entity to review which title reports are available in a particular area. Process 400 can include receiving an access request for the title from a third user device seeking a copy of the title responsive to purchasing the title. The third party user device can be associated with a requesting entity, which can be the original requesting entity or another requesting entity. Process 400 can include transmitting, via a transceiver (e.g., transceiver 280), the title to the third user device.

FIG. 5 depicts an example generated title summary 500, according to the present disclosure. A benefit of the present systems and methods is that they also provide an automated approach to create a title summary, which can describe all property documents within the generated title. The title summary 500 can include fields describing the title. The fields can include a property information field 505, which described the property title, including address, when the title was searched, the type of real property, and the like. The fields can include a property legal information field 510 that includes the type of property (e.g., subdivision), district, lot, subdivision name, etc. The fields can include a current owner field 515 that shows who has the most recent interest in the real property. The fields can further include a security interest field 520, a judgement/liens field 525, an easements/leases field 530, and/or a protective covenant field 535. These fields can be populated based on what types of property documents are uploaded, for example as indicated by the metadata from one or more document inputs describing the document. The fields can also include a chain of title field 540 listing all or a portion of the transfers of ownership of the real property. In some examples, the fields can include a taxes field 545 including information related to taxes, which can be retrieved, for example, from the document entity 112.

Figure 6A:
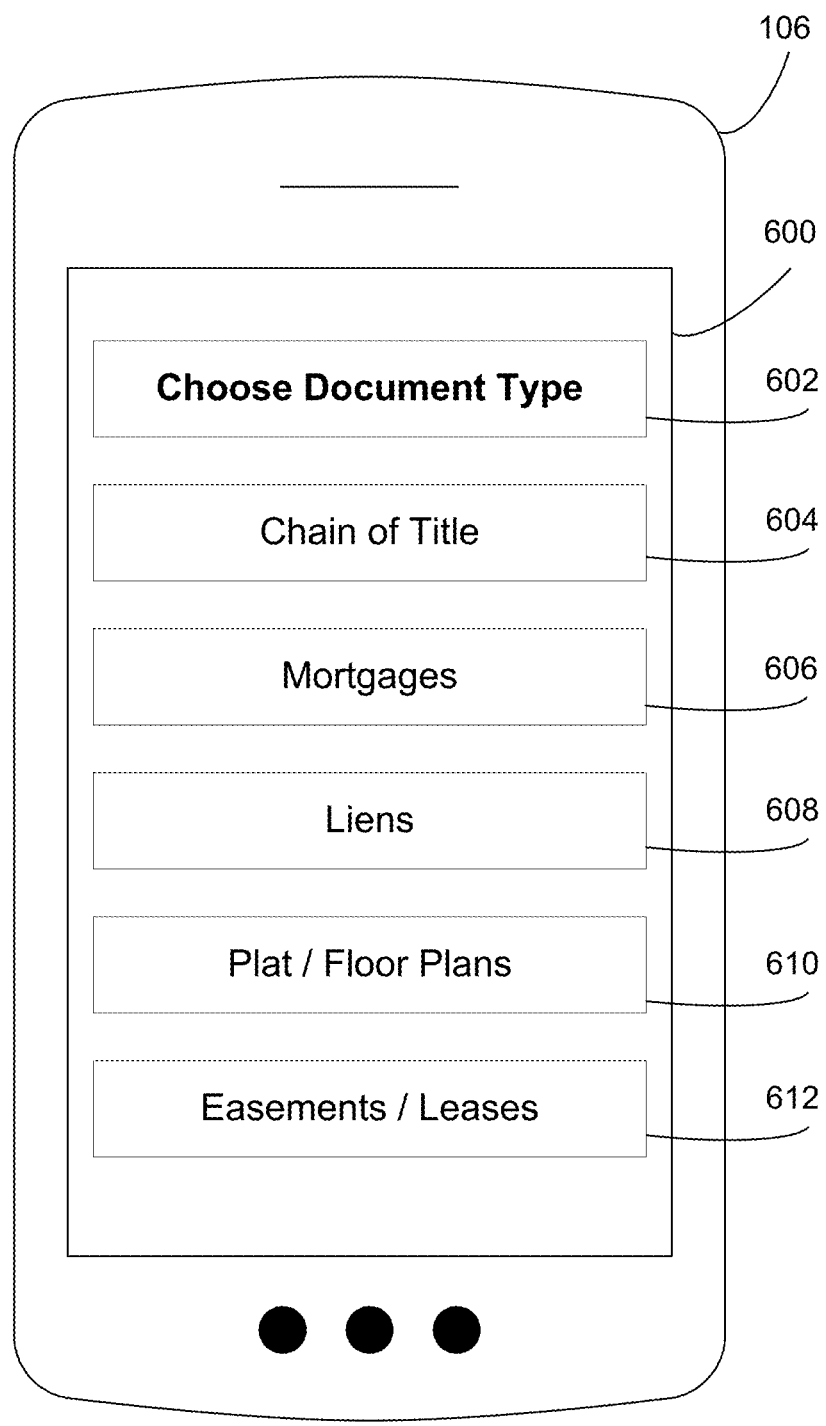
FIG. 6A depicts an example graphical user interface for receiving a document input, according to the present disclosure.
Figure 6B:
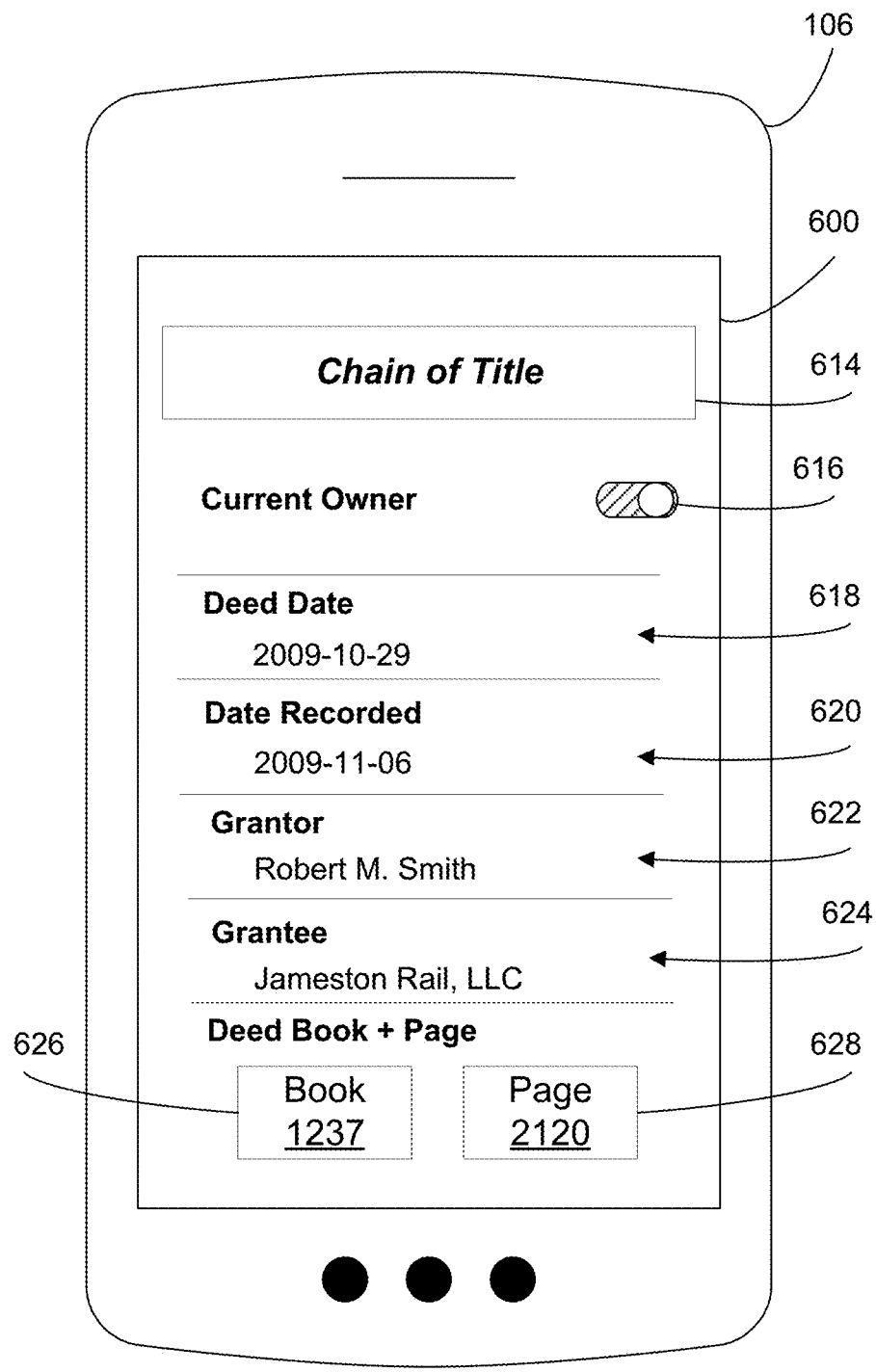
FIG. 6B depicts an example graphical user interface for receiving a document input and/or a timing element, according to the present disclosure.

FIG. 6A depicts an example graphical user interface (GUI) 600 for receiving a document input, according to the present disclosure. As described above, one aspect of the present systems and methods includes adding metadata to digital property documents so as to identify them for ordering/sequencing purposes (for example based on property type and/or timing element). FIG. 6A provides a GUI 600 that is associated with the title system 102 that enables a user device 106 to provide document inputs associated with document type, as shown in the header 602 stating "Choose Document Type." When a user device 106 retrieves a property document (e.g., as a digital file downloaded from the document entity 112 or as a scan/photograph of a hard copy document), the user of the device can provide a document input that described the document. The GUI 600 can include fields associated with various document types, such as a chain of title field 604, mortgages field 606, liens field 608, plat/floor plans field 610, easements/leases field 612, or any other number of fields associated with document types uploadable to the system. Upon selecting one of the fields, the title system 102 and/or user device 106 can append metadata associated with the uploaded property document.

In other examples, the document input that identifies the property document can be inputted automatically. To illustrate using a hard-copy version of a property document, the recorded document will ordinarily have a descriptor on the page written in text, indicating whether the document reflects a security interest, lien, etc. This can be true for contemporary documents, such as those typed within the past 50 years, but also with older documents including 19th century documents. Even if portions of the property document were handwritten, many times these documents included heading that were typeface. Using the document identifiers on the face of the document, the user device 106 and/or title system 102 can perform optical character recognition (OCR) on the document to automatically identify the document type (e.g., a document input). The user device 106, for example, can capture an image of the hard-copy document via an input/output device (e.g., I/O device 330, which can include a digital camera or other image capture device). The user device 106 can then perform OCR, or the user device 106 can transmit a digital copy of the captured document to the title system 102, which can perform OCR. OCR can also be performed on digital documents downloaded from the document entity 112.

FIG. 6B depicts an example GUI 600 for receiving a document input including a timing element, according to the present disclosure. As described above, the metadata that is added to the digital copies of the property documents can include an indication of when the document was recorded (e.g., a timing element). The timing element can include a deed date (shown in field 618), a date recorded (shown in field 620), or information related to the deed book in which the property document is recorded (as shown in deed book field 626 and page field 628). Deed book locations (i.e., book number and page number) can be sequenced according to arranging rules. For example, in a given county or state, each deed book can include character identifiers (e.g., numbers, letters, or combinations of numbers and letters) identifying the sequence in which deed books fall. To illustrate using character identifiers that are numbers, it is likely that a deed book numbered 1000 comes chronologically before a deed book numbered 1500. To illustrate using character identifiers that are letters, a deed book labeled A can come before a deed book labeled AA; whereas a deed book labeled B may come between deed book A and deed book AA chronologically. Accordingly, depending on the rules for the particular jurisdiction, the system can store (for example in database 118 and/or database 250) these arranging rules on a jurisdiction-specific basis. If a title request is received for a real property in State X, then the title system 102 can retrieve the arranging rules for State X in which to arrange (chronologically) the documents in the completed title report. It is contemplated that the deed book number and page number can be entered into GUI 600 as shown (e.g., in deed book field 626 and page field 628). In other examples, these timing elements can be identified via OCR, as described above.

FIG. 6B shows other details of an example GUI 600 for receiving timing elements, including additional fields, including a title indicator field 614 that indicates what type of document is being uploaded. In the case that the GUI 600 shows a page for "Chain of Title," as shown, the GUI 600 can include a current owner toggle 616 that indicates whether this is most recent chain in that title. Further in the case that the GUI 600 shows a page for "Chain of Title," the interface can also show the grantor (in grantor field 622) and grantee (in grantee field 624). Each of these document inputs can also be identified via OCR, as described above.

Figure 6C:
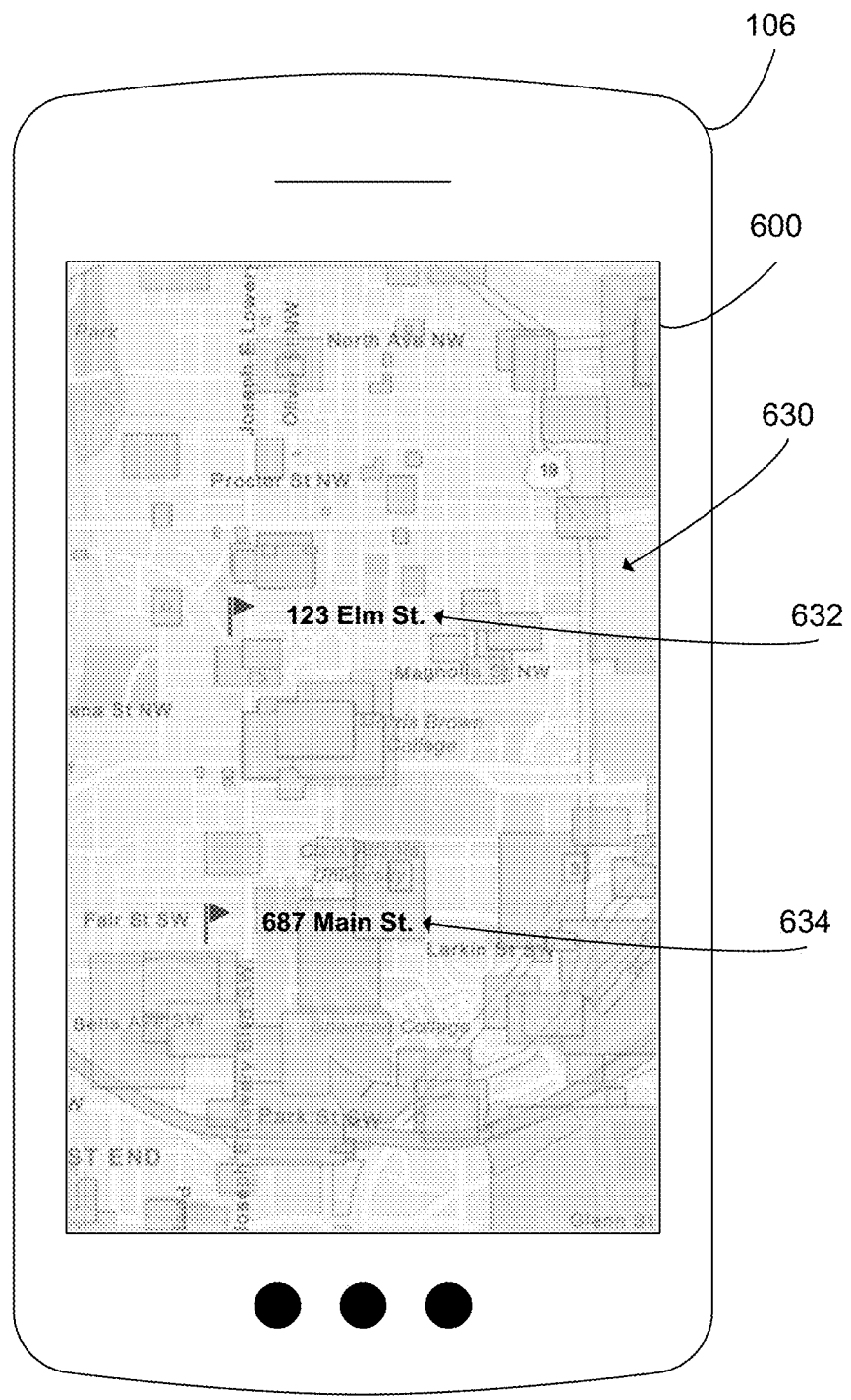
FIG. 6C depicts an example graphical user interface for displaying available titles within a map interface, according to the present disclosure.

FIG. 6C depicts an example GUI 600 for displaying titles that are available within a map 630 interface, according to the present disclosure. As described above, one aspect of the present disclosure provides a system and method for uploading previously-generated title reports to a cloud service so that the titles are available for purchase or exchange. One drawback to prior designs is that if one requesting entity, say a first law firm, requested a title, that title was generated for use by the first law firm. If a second law firm wished to run a title search on the same property, that firm would need to hire an abstractor to duplicate the work that was already completed. The present systems and methods provide an option of sharing the completed title report on a cloud-based platform (e.g., web server 120) so that other requesting entities can purchase the title. The completed title reports can be saved, for example, in a database (e.g., databases 118, 124, and/or 250) for access.

In one aspect, the titles can be listed in a GUI 600 provided by the system (e.g., the title system 102) and can be searchable by a property identifier, such as an address, a parcel number, and the like. In other examples, available titles can be displayed on a map 630 within the GUI 600. The map 630 can include one or more icons, e.g., a first icon 632 and a second icon 634, that allows a user of the service to select a property of interest to retrieve the saved title report. This can be valuable for developers that wish to run title searches on many properties in a given subdivision— using the map 630 they can locate which properties in that subdivision already have a saved title report. If a property in a subdivision is not available, the developer (or other requesting entity 110) can request a new title for that property.

The map 630 provided in the example GUI 600 shown in FIG. 6C can be a map that is native to the title system 102 (e.g., the title system 102 stores the map information within database 118, database 250, etc.). In other examples, the map can be provided to a user interface via the mapping service 114. Mapping services 114 can include companies that provide map interfaces for customers, such as the map interfaces associated with Google®, Apple®, Waze®, etc. The title system 102 can communicate with the mapping service 114 via an API (e.g., API 115) that allows the third-party service to embed maps 630 in the GUI 600 of the title system 102, for example via HTTP requests and similar requests.

Another aspect of the present disclosure is that each property that is saved in the database (e.g., for example, database 118, database 250) can have more than one title report and title summary associated with the property. For example, a first abstractor can use the processes described herein to create a first title report (e.g., by using the process 400 described above with reference to FIG. 4), and the system can store that title report. That first title report will have a first effective date, i.e., a date for which that title is "effective" through. A period of time can pass, and another abstractor can create a second title report in a similar manner. The second title report can have an effective date that is later than the first title report. These two title reports can be stored for the single real property of interest, and can be selectable/purchasable by a requesting entity 110 and/or another abstractor. The system can tier pricing of all title reports stored for a property by the effective date—i.e., the first (older) title report can be cheaper than the second (newer) title report. The requesting entity 110 and/or other abstractor then has options of which title report to purchase. It is likely that, regardless of the effective date of the title report(s), an updated search will be required so that the abstractor can confirm the title search is current. By tiering the pricing structure of the reports, the requestor can select an older, cheaper title report, and build upon the report from the effective filing date of that title report. To illustrate using a non-limiting example, a property may have property documents dating back to 1890. The system, in this example, stores two title reports, a first with an effective date of Jun. 18, 2017 and a second with an effective date of Jan. 3, 2021. The requestor can select the 2017 report for a lower price, and then build a new report (e.g., using process 400 in FIG. 4) that includes any property document from Jun. 18, 2017 to today. In effect, the abstractor was able to receive a title report for all documents from 1890 to 2017, but save money on the documents from 2017 to 2021, since that work may be minimal yet must be completed to confirm accuracy up until today.

Figure 7:
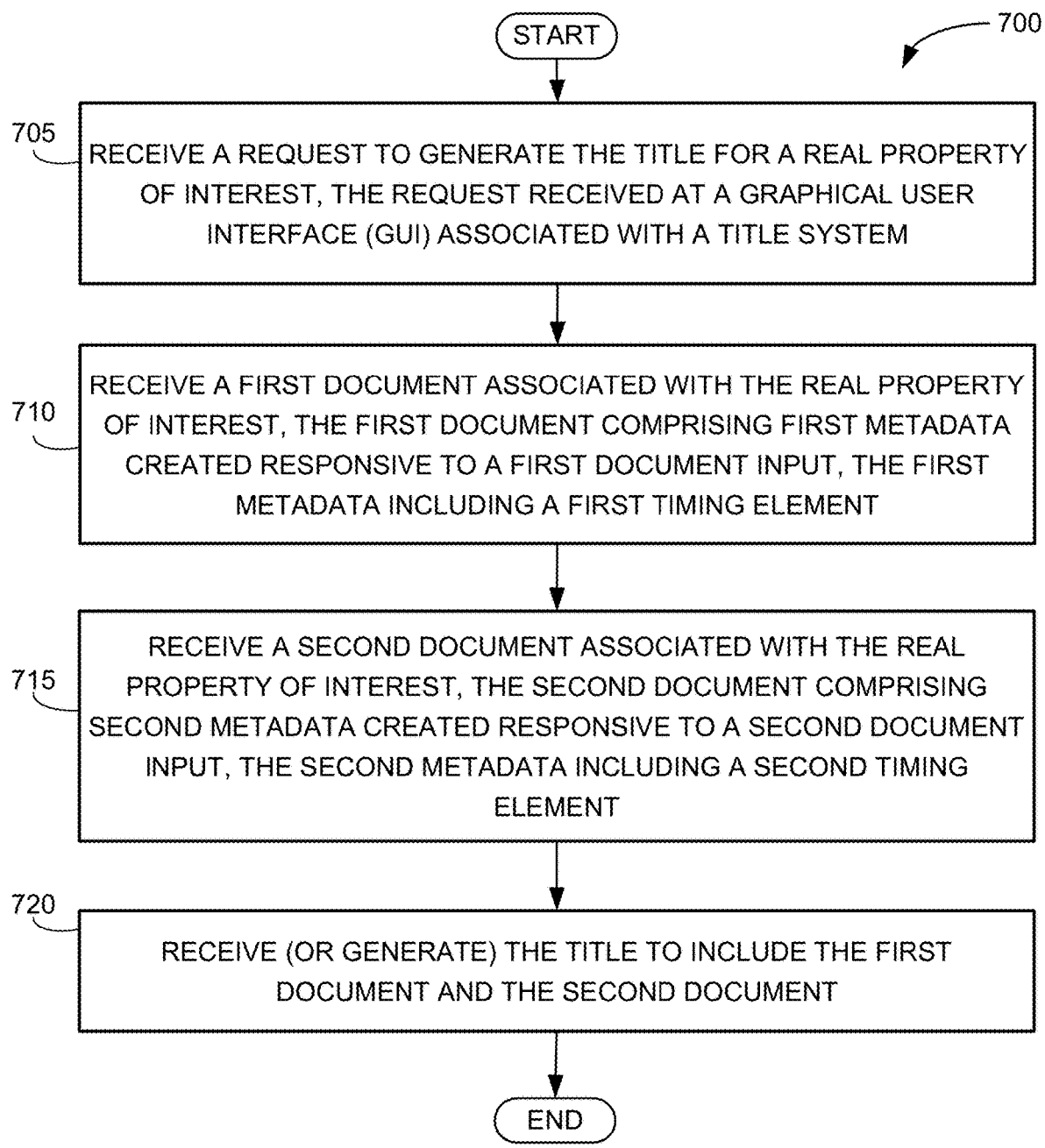
FIG. 7 is a flowchart of an example process for building and uploading a title in a standardized format, according to the present disclosure.

FIG. 7 is a flowchart of an example process 700 for building and uploading a title in a standardized format, according to the present disclosure. The steps of process 700 can be performed by components of one or more user devices (e.g., processor 210 and memory 220 of user device 106). In block 705, process 700 can include receiving a request to generate the title for a real property of interest. The request can be received at a GUI associated with a title system (e.g., one or more components of the title system 102). The request can be selected in a field within a GUI that requests to build a new title or add to a previously-started title.

In block 710, process 700 can include receiving a first document associated with the real property of interest. The first document can be retrieved from third-party service that stores digital copies of property documents (e.g., a government entity and/or another document entity 112). The documents can be retrieved in a digital format, such as a PDF, JPEG, MPEG, PNG, or other document format. The first document can include first metadata created responsive to a first document input. The first document input can be received via an input into a GUI (e.g., GUI 600 shown in FIGS. 6A and 6B above) and/or via OCR, as described above. The first metadata can include a first timing element describing when the document was recorded.

In block 715, process 700 can include receiving a second document associated with the real property of interest. The second document can be another digital file retrieved from a third-party service. The second document can be digital copy of a hard-copy file retrieved from a document-storing facility, such as a country courthouse. In these examples, the digital file can be received, at the one or more processors of the user device, via a digital camera or other input/output device. The second document can include second metadata created responsive to a second document input. The second document input can be received via an input into a GUI (e.g., GUI 600 shown in FIGS. 6A and 6B above) and/or via OCR, as described above. The second metadata can include a second timing element describing when the document was recorded.

In block 720, process 700 can include receiving, for example at a transceiver (e.g., transceiver 350), the title that includes the first document and the second document appearing within the title. Instead of receiving the title, the user device can generate the title independently of the backend (e.g., independent of the title system 102). This receiving/generating step can conclude with a user of the user device receiving a fully-created title report for the property, including the first document, the second document, and any other document(s). In the title, the first and second document can be arranged based on at least one of (i) the first timing element and the second timing element, or (ii) a standardized order for title documentation. The standardized order can be based on industry standards or client standards, as described above. Process 700 can end after block 720. In other examples, additional steps can be performed according to the examples described herein.

Figure 8:
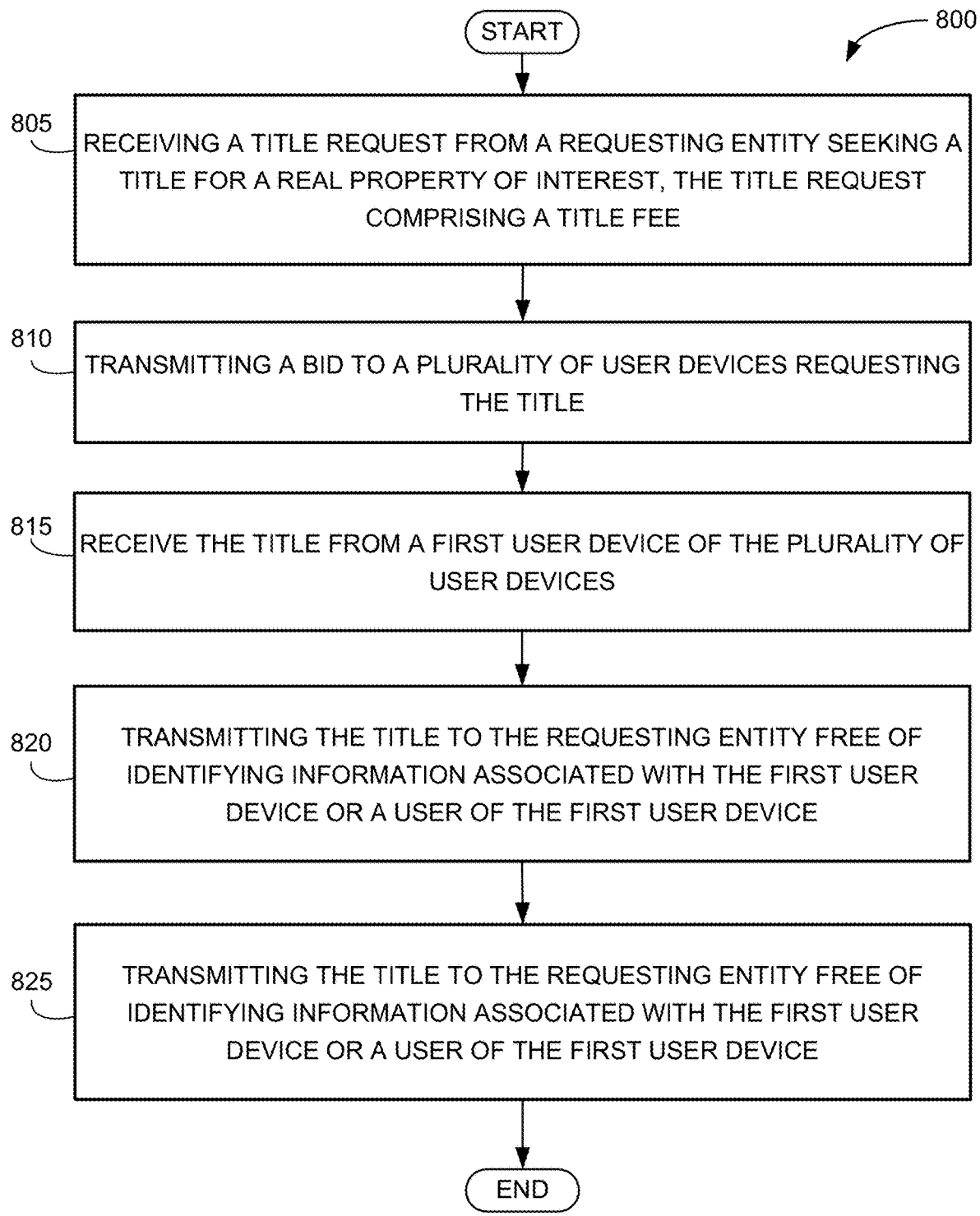
FIG. 8 is a flowchart of an example process for exchanging and storing titles, according to the present disclosure.

FIG. 8 is a flowchart of an example process 800 for exchanging and storing titles, according to the present disclosure. Another aspect of the present disclosure provides options for one or more requesting entities (e.g., requesting entit(ies) 110) to request a title search and full title report from one or more abstractors. The request can be transmitted to the service (e.g., title system 102), requesting a title for a particular real property of interest. This can be the case, for example, when a requesting entity, like a law firm, does not have an employed or contracted abstractor in a particular location, e.g., a county in a state. The title service that operates the title system 102 can operate to find an abstractor that can run the title using the systems and methods described herein, and do so by selecting an abstractor based on particular parameters. These parameters can include abstractor rankings and/or ratings or abstractor proximities to a particular document storage facility, e.g., proximity to a county courthouse. Further, the systems and methods can also position the title system 102 as an intermediary between the requesting entity and abstractor so that information about the requesting entity is never provided to the abstractor, and information about the abstractor is never provided to the requesting entity. In this manner, the title service can ensure that any work product created by the title system 102 with input by the abstractor is exchanged through the system and not directly between the abstractor/requesting entity. This ensures that the title system provider receives payment for providing the systems and methods described herein for creating the title, and, in some examples, the final product can be uploaded to an online server for other requesting entities to purchase, as described above.

Referring to process 800, the process steps can be performed by one or more components of a title system 102 (e.g., title sub-system 104 and/or web server 120). In block 805, process 800 can include receiving a title request from a requesting entity seeking a title for a real property of interest. The title request can include a title fee. For example, the requesting entity can agree to pay a particular fee to the title service provider to run the title report. This fee can also pay the final abstractor for his/her work in processing the title.

In block 810, process 800 can include transmitting, via a transceiver (e.g., transceiver 280), a bid to a plurality of user devices requesting the title. The title system can store a list of abstractors that can run titles for any given jurisdiction. The title abstractors, or the user device that is associated with the abstractor, can be chosen based on a number of factors. In one example, the title system 102 can store a list of title abstractors that work in a given jurisdiction (for example a particular state or region of a state). The title system 102 can also rank the title abstractors known to the system based on criteria defined by the title service. For example, the title system 102 can store which title abstractors run a title search via the systems and methods described herein within a predetermined period of time, ranking those title abstractors that generate a title report more quickly higher than slower abstractors. The ranking can also be based on a quantity of titles performed by the abstractor(s), where abstractors that generate more titles are ranked higher than less experienced abstractors, or vice versa. Using this ranking system, the title system 102 can choose a subset of user devices of the plurality of user devices in which to send the bid in block 810. This can also provide an incentive to other abstractors to work more efficiently with respect to title generation so that they are included in more bids in the future. In other examples, the title system 102 can choose which user devices of a larger set of user devices receive a bid based on proximity to a location of the real property of interest. For example, if a request is for a property at 123 Elm Street in Fulton County, the title system 102 can determine which user devices of the plurality of user devices registered to abstractors are within a predetermined distance of 123 Elm St. In other examples, the title system 102 can determine which user device is located within a predetermined distance of a courthouse within a county in which the real property of interest is situated. For example, if 123 Elm Street is located in Fulton County, the title system 102 can determine which user devices of the plurality of user devices registered to abstractors are within a predetermined distance of the Fulton County courthouse. This distance ranking can be performed by tracking or pinging locations of user devices of registered abstractors that have location services to a track location of the abstractor devices (for example when the user devices include a geographic location sensor, as described below). It is also contemplated that a user device of the plurality of user devices can be selected based on both (i) a ranking and (ii) proximity to the real property and/or proximity to the courthouse.

In block 815, process 800 can include receiving the title from a first user device of the plurality of user devices. Again, the first user device can be any one of the user devices used by abstractors. The title can be created by any of the methods or processes described herein, including those described above for process 700 in FIG. 7. In block 820, process 800 can include transmitting the title to the requesting entity. The title can be transmitted to the requesting entity free of any identifying information associated with the first user device or a user (e.g., abstractor) associated with the first user device. This can ensure that the abstractor is paid by the title service, that the requesting entity receives their title report, and that the abstractor and requesting entity cannot perform transactions outside of the environment provided by the title system 102, e.g., no side-dealing. In block 825, process 800 can include transmitting an indication of at least a portion of the title fee to the first user device. This step can include, for example, transmitting a notification to the first user device that the title system 102 has transferred a sum of money to an account associated with the first user device. Process 800 can end after block 825. In other examples, additional steps can be performed according to the examples described herein.

As described throughout this disclosure, an aspect of the present disclosure provides a way for abstractors to monetize their efforts in using the system to build and upload a completed title report (e.g., by using the processes described in process 400 in FIG. 4 and/or process 700 in FIG. 7). In any of the embodiments described herein, the systems and methods can provide an exclusivity period for an abstractor that uploads a title document into an exchange environment. For example, if a first abstractor uploads a title into the system for purchase by other entities (e.g., other abstractors and/or other requesting entities 110), the system can provide that abstractor a predetermined period of time in which that uploaded title is the "newest" title in the system (e.g., most current effective date). That exclusivity period can be one week, two weeks, a month, etc. Other abstractors can build reports during this exclusivity period, but those newer reports can be stored in the system until the exclusivity period is over. Once the exclusivity period is over, the newer abstracts can be published for purchase (e.g., as described above with reference to FIG. 6C). This can help prevent later abstractors from purchasing the title report built by the first abstractor, and then republishing the same title report for a price less than the first abstractor. Further, any new report built after that exclusivity period can have another exclusivity period. For example, the first abstractor (or anyone else) can build a new report sometime after the exclusivity period of the first report is over, and the new report will have a new exclusivity period.

Figure 9:
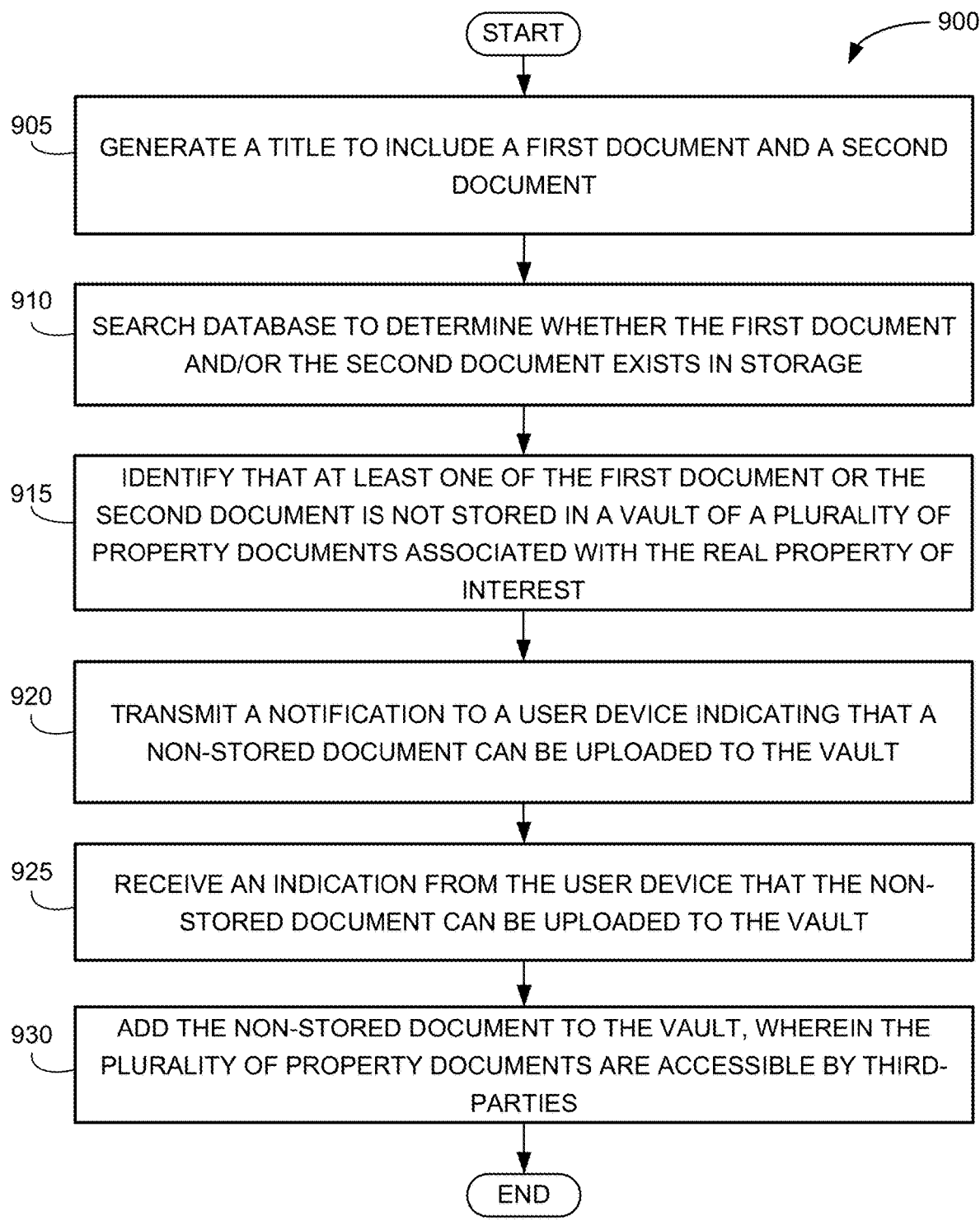
FIG. 9 is a flowchart of an example process for saving individual property documents in a vault, according to the present disclosure.

FIG. 9 is a flowchart of an example process 900 for saving individual property documents in a vault, according to the present disclosure. Another aspect of the present disclosure provides an environment where any single property document retrieved and/or uploaded using the processes described herein (e.g., by process 400 in FIG. 4) can be saved in a "vault" for that real property of interest. The vault can be accessed by third parties (e.g., requesting entities 110) that are not searching for an entire title report with a title summary, but are instead interested in one or more individual documents associated with that property. The individual property document embodiment can build upon any of the preceding processes.

Referring to process 900, the process steps can be performed by one or more components of a title system 102 (e.g., title sub-system 104 and/or web server 120). In block 905, process 900 can include generating a title to include one or more documents. For example, an abstractor can use the systems described above with reference to process 400 in FIG. 4 to begin building a title report. The process can include uploading one or more property documents and saving them to the title system 102. This can include a first document and a second document, as described herein, or a single document.

In block 910, process 900 can include the title system 102 searching a database (e.g., databases 118, 124, and/or 250) to identify if one or more of the documents exist in storage. This step can include searching a vault of a plurality of property documents stored by the system for the property. The property documents can be received from an abstractor building a title report as described herein. The system can store the entire generated title report as well as each individual property document within the title report. The metadata appended to each of the property documents can work as an identifier for the individual property documents. For example, a mortgage for 123 Elm Street can be saved and searchable by identifiers such as the property address, the recordation date, the execution date, and any property identifier received as a property input and/or a timing element.

In block 915, process 900 can include identifying that at least one document (e.g., at least one of a first document or a second document) is not stored in the vault of documents associated with the real property of interest. If any of the property documents have never been stored for that property, the system can ask the user if that document should be uploaded into that property's vault. At block 920, process 900 can include transmitting a notification to a user device indicating that a non-stored (e.g., one of the first or second documents) can be uploaded to the vault for that property.

In block 925, process 900 can include receiving an indication from a user device (e.g., via the GUIs described herein) that the non-stored document can be uploaded to the vault. At block 930, process 900 can include adding the non-stored property document to the vault. At this point, the new property document can be accessed from a third party (e.g., a requesting entity 110) individually. Process 900 can end after block 930. In other examples, additional steps can be performed according to the examples described herein.

In some examples, the person that uploaded the document(s) into the vault can be paid for each copy retrieved by a requesting entity. A document storage entity, such as the county courthouse or other document repository, can charge a certain amount for copies of documents. The present systems enable the person who did the work to upload the document and provide document inputs/timing elements to receive at least a portion of the fee associated with any copy. The uploader can be an abstractor, as described herein, or any other user, such as a government employee using the title system 102 to store digital copies of the hard-copy documents stored at the courthouse.

Referring again to the system environment 100 described above, the components and arrangements shown in FIG. 1 are not intended to limit the disclosed embodiments as the components used to implement the disclosed processes, and features may vary. As shown, the title system 102 can interact with a user device 106, the requesting entity 110, the document entity 112, and/or the mapping service 114 via a network 108. In certain example implementations, the title system environment 102 can include a web server 120, a local network 116, title sub-system 104, and a database 118.

In some embodiments, an abstractor can operate the user device 106, for example to provide the property documents and/or document inputs. Again, although FIG. 1 depicts a single user device, it is contemplated that an abstractor can perform the processes described herein with one or more user devices. The user device 106 can include one or more of a mobile device, smart phone, general purpose computer, tablet computer, laptop computer, other mobile computing device, or other device capable of communicating with the network 108 and ultimately communicating with one or more components of the system environment 100.

The network 108 may include any type of computer networking arrangement used to exchange data. For example, the network 108 may be the Internet, a private data network, virtual private network using a public network, and/or other suitable connection(s) that enable(s) components in the title system 102 to send and receive information between the components of the system environment 100. The network 108 may also include a public switched telephone network ("PSTN") and/or a wireless network.

In accordance with certain example implementations, a requesting entity 110, e.g., the party seeking to receive a generated title report, may be in communication with the title system 102 via the network 108. In certain implementations, the requesting entity 110 can include a computer system associated with an entity that performs one or more functions associated with requesting and/or purchasing a title report.

The title system 102 may be associated with and optionally controlled by one or more entities such as a business, corporation, individual, partnership, or any other entity that provides one or more of goods, services, and consultations to individuals such as customers. The title system 102 may include one or more servers and computer systems for performing one or more functions associated with products and/or services that the organization provides. Such servers and computer systems may include, for example, the web server 120 as well as any other computer systems necessary to accomplish tasks associated with the organization or the needs of customers (which may be customers of the entity associated with the organization). The web server 120 may include a computer system configured to generate and provide one or more websites accessible to customers, as well as any other individuals involved in an organization's normal operations. The web server 120, for example, may include a computer system configured to receive communications from the user device 106 via for example, a mobile application, a chat program, an instant messaging program, a voice-to-text program, an SMS message, email, or any other type or format of written or electronic communication. The web server 120 may have one or more processors 122 and one or more web server databases 124, which may be any suitable repository of website data. Information stored in the web server 120 may be accessed (e.g., retrieved, updated, and added to) via the local network 116 (and/or the network 108) by one or more devices (e.g., the title sub-system 104) of the system environment 100.

The local network 116 may include any type of computer networking arrangement used to exchange data in a localized area, such as WiFi, Bluetooth™ Ethernet, cellular, and other suitable network connections that enable components of the title system 102 to interact with one another and to connect to the network 108 for interacting with components in the system environment 100. In some embodiments, the local network 116 may include an interface for communicating with or linking to the network 108. In other embodiments, certain components of the system environment 100 may communicate via the network 108 without a separate local network 116.

In accordance with certain example implementations of the disclosed technology, the title system 102 may include one or more computer systems configured to compile data from a plurality of sources, such as the web server 120, the title sub-system 104, and/or the database 118. The title sub-system 104 may correlate compiled data, analyze the compiled data, arrange the compiled data, generate derived data based on the compiled data, and store the compiled and derived data in a database such as the database 118. According to some embodiments, the database 118 may be a database associated with an organization and/or a related entity that stores a variety of information relating to customers, transactions, and business operations. The database 118 may also serve as a back-up storage device and may contain data and information that is also stored on, for example, databases 124 and 250 (as discussed with reference to FIG. 2).

Referring again to FIG. 2, the title sub-system 104 may include a processor 210, an input/output ("I/O") device 260, a memory 220 containing an operating system ("OS") 230 and a program 240. In certain example implementations, the title sub-system 104 may be a single server or may be configured as a distributed computer system including multiple servers or computers that interoperate to perform one or more of the processes and functionalities associated with the disclosed embodiments. In some embodiments, the title sub-system 104 may further include a peripheral interface, a communication interface 270 (including, for example, a transceiver 280), a mobile network interface in communication with the processor 210, a bus configured to facilitate communication between the various components of the title sub-system 104, and a power source configured to power one or more components of the title sub-system 104.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver 280 may be configured to communicate with compatible devices and ID tags when they are within a predetermined range. A transceiver 280 may be compatible with one or more of: cellular, radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 220 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 220.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the title sub-system 104 may include one or more storage devices configured to store information used by the processor 210 (or other components) to perform certain functions related to the disclosed embodiments. In one example, the title sub-system 104 may include the memory 220 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the title sub-system 104 may include a memory 220 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the title sub-system 104 may include the memory 220 that may include one or more programs 240 to perform one or more functions of the disclosed embodiments. For example, in some embodiments, the title sub-system 104 may additionally manage dialogue and/or other interactions with the customer via a program 240.

The processor 210 may execute one or more programs 240 located remotely from the title system 102. For example, the title system 102 may access one or more remote programs 240, that, when executed, perform functions related to disclosed embodiments.

The title sub-system 104 may include stored data relating to weighting sub-score, phone numbers, emails, and user device locations associated with a plurality of users. According to some embodiments, the functions provided by a categorizing database 250 may also be provided by a database that is external to the title sub-system 104, such as the database 118 as shown in FIG. 1.

The title sub-system 104 may also include one or more I/O devices 260 that may comprise one or more interfaces for receiving signals or input from devices and providing signals or output to one or more devices that allow data to be received and/or transmitted by the title sub-system 104. For example, the title sub-system 104 may include interface components, which may provide interfaces to one or more input devices, such as one or more keyboards, mouse devices, touch screens, track pads, trackballs, scroll wheels, digital cameras, microphones, sensors, and the like, that enable the title sub-system 104 to receive data from a use (such as, for example, via the user device 106).

Referring to FIG. 3, which is a component diagram of an example user device 106, the user device 106 can be a mobile computing device (e.g., a smart phone, tablet computer, smart wearable (e.g., a smart watch), portable laptop computer, or other mobile computing device) or a stationary device (e.g., desktop computer). The user device 106 can include a processor 305 similar to the processor 210 described above. The user device 106 can also include a memory 310, operating system 315, one or more programs 320, and/or data storage 325, which can be similar to the memory 220, OS 230, one or more programs 240, or database 250, respectively, as described above. The user device 106 can also include a communication interface 345 that includes a transceiver 350, which can be similar to the communication interface 270 and transceiver 280 described above.

The operating system 315 can enable the user device 106 to operate the various applications described herein. A program 320, for example, can include an application associated with the title system 102. The operating system 315 can operate an account provider application that enables the user device 106 to display a GUI associated with the title system 102.

The user device 106 can also include one or more input/output ("I/O") devices 330 that can include one or more interfaces for receiving signals or input from devices and providing signals or output to one or more devices that allow data to be received and/or transmitted by the user device 106. For example, the user device 106 can include interface components, which can provide interfaces to one or more input devices, such as one or more keyboards, mouse devices, touch screens, track pads, trackballs, scroll wheels, digital cameras, microphones, sensors, and the like, that enable the user device 106 to receive data from one or more users.

The user device 106 can also include a user interface ("U/I") device 335 for receiving user input data, such as data representative of a click, a scroll, a tap, a press, or typing on an input device that can detect tactile inputs. According to some examples, U/I device 335 can include some or all of the components described with respect to I/O device 330 above. The U/I device 335 can be defined as the "input" of the user device 106. The user device 106 can also include a geographic location sensor ("GLS") 340 for determining the geographic location of the user device 106.

The user device 106 can include a display 355. The display 355 can provide visual representation of the various websites, applications, and/or GUIs described herein. The display 355 can also be a U/I device 335 in the case that the user device 106 has touchscreen capabilities. In other words, in some examples the display 355 can be the "input" of the user device 106.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

What is claimed is:

1. A method for exchanging and storing titles, the method comprising:
- receiving, at one or more processors, a title request from a requesting entity seeking a title for a real property of interest, the title request comprising a title fee;
- transmitting, via a transceiver in communication with one or more processors, a bid to a plurality of user devices requesting the title;
- receiving, at the one or more processors and in response to the bid, a first document associated with the real property of interest, the first document comprising first metadata created responsive to a first document input received from a first user device, the first metadata including a first timing element;
- receiving, at the one or more processors, a second document associated with the real property of interest, the second document comprising second metadata created responsive to a second document input received from the first user device, the second metadata including a second timing element;
- generating, via the one or more processors, the title to include the first document and the second document appearing within the title in an order based on at least one of:
  - (i) the first timing element and the second timing element; or
  - (ii) a standardized order for title documentation;
- allocating, via the one or more processors and responsive to the title being generated, a predetermined exclusivity period to the title, the predetermined exclusivity period corresponding to a period of time in which the title is published for purchase as a most-recent title for the real property of interest;
- transmitting, via the transceiver, the title to the requesting entity free of identifying information associated with the first user device or a user of the first user device; and
- transmitting, via the transceiver, an indication of at least a portion of the title fee to the first user device.

2. The method of claim 1 further comprising selecting, via the one or more processors, the plurality of user devices from a larger subset of user devices stored in a database comprising a list of title abstractors, the plurality of user devices being selected based on a ranking system associated with users of the plurality of user devices.

3. The method of claim 1, further comprising selecting, via the one or more processors, the first user device from the plurality of user devices based on proximities of the plurality of user devices to a location of the real property of interest, wherein the plurality of user devices comprise a geographic location sensor configured to determine a location of a respective user device.

4. The method of claim 1, wherein:
- the first document is a digital file retrieved by the first user device from a document entity storing a plurality of property documents; and
- the second document is an image file captured by the first user device and/or a second user device, the image file being associated with a hard copy of a property document.

5. The method of claim 4 further comprising using, via the one or more processors, optical character recognition (OCR) to identify at least one of:
- the first timing element;
- the second timing element;
- the first document input; or
- the second document input.

6. The method of claim 1, wherein the first document input and the second document input are received from one or more fields in a graphical user interface (GUI) associated with the one or more processors and displayed on the first user device and/or a second user device, and comprises information about which type of property document is being uploaded.

7. The method of claim 1, wherein:
- the first timing element includes at least one of a first recordation date or a first deed book location associated with the first document; and
- the second timing element includes at least one of a second recordation date or a second deed book location associated with the second document.

8. The method of claim 7, wherein:
- the first deed book location and/or the second deed book location comprise character identifiers configured to arrange one or more deed books chronologically;
- the one or more deed books are chronologically arranged according to one or more arranging rules; and
- the method further comprises:
  - storing, in a database, the one or more arranging rules for the one or more deed books; and
  - arranging, via the one or more processors, the first timing element and the second timing element based on the one or more arranging rules.

9. The method of claim 1 further comprising:
- storing, in a database, a plurality of title reports comprising the title, the plurality of title reports being accessible by a plurality of user devices and searchable based at least upon property addresses associated with a plurality of real properties;
- receiving, at the one or more processors, an access request for the title from a third user device seeking a copy of the title responsive to purchasing the title; and
- transmitting, via a transceiver, the title to the third user device.

10. The method of claim 9 further comprising generating for display, via the one or more processors, the plurality of real properties on a map within a graphical user interface displayed on the plurality of user devices, wherein a location of each of the plurality of real properties is superimposed on the map, and wherein the location of each of the plurality of real properties is selectable to view and/or purchase a title report associated with a selected property.

11. The method of claim 1 further comprising:
- receiving, at the one or more processors, a partial address for the real property of interest; and
- auto-filling, via the one or more processors and a mapping application programming interface (API) connecting the one or more processors to a third-party map service, a full address for the real property of interest to confirm a recording address for the real property of interest is accurate and consistent for all user devices accessing a database associated with the one or more processors.

12. The method of claim 1, wherein the predetermined exclusivity period is at least one of the following: a day, a week, two weeks, a month, two months, or a combination thereof.

13. The method of claim 1, wherein one or more additional user device of the plurality of user devices generates one or more additional reports related to the title, wherein the one or more additional reports are stored until an end of the predetermined exclusivity period.

* * * * *